March 25, 1969  J. O. HICE  3,434,301
FOOD PRODUCT CRYOGENIC FREEZING SYSTEM
Original Filed Feb. 1, 1967

INVENTOR
JACKSON O. HICE
BY
Barnwell P. King
ATTORNEY

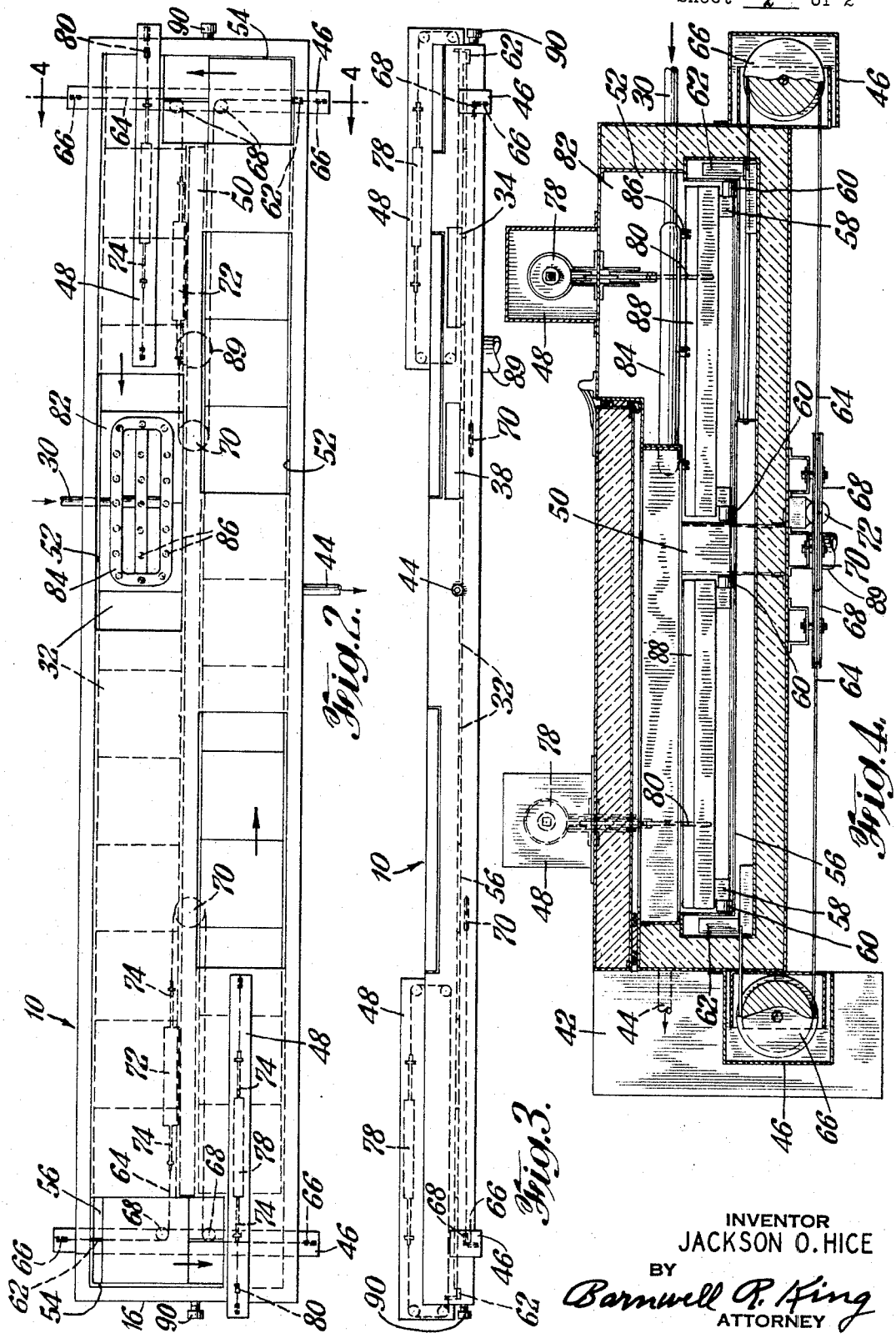

United States Patent Office 3,434,301
Patented Mar. 25, 1969

3,434,301
FOOD PRODUCT CRYOGENIC FREEZING SYSTEM
Jackson O. Hice, New York, N.Y., assignor to Union Carbide Corporation, a corporation of New York
Continuation of application Ser. No. 613,281, Feb. 1, 1967. This application Feb. 9, 1968, Ser. No. 704,492
Int. Cl. F25d 25/04, 17/02
U.S. Cl. 62—374                                7 Claims

ABSTRACT OF THE DISCLOSURE

Flat frames carrying various types of trays, pans, racks, or other means of supporting product to be frozen, are moved on the floor of and guided by side walls of an insulated low tunnel providing an elongated rectangular path for the frames as they are conveyed through the tunnel. Cryogenic liquefied gas (nitrogen) is injected into the tunnel either as a fluid or as a fluid spray at one or more selected stations in the tunnel. The frames are provided with a means of almost totally sealing one or more sections of the rectangular tunnel aperture in order to control the flow of the cryogenic vapor as it is expanded from the liquid to the gas phase. One such means is by using the end wall of each frame as a moving seal within the tunnel. Where shallow pans are used inside each frame and liquid or liquid spray is injected or pressure sprayed on the food or other product to be frozen the unflashed liquid is retained in the flat pan in direct contact with the product to be frozen, permitting immersion or semi-immersion heat transfer as the product is moved through the system, and the constant contact of the vaporizing liquid with the product until all liquid has been vaporized.

The super cold surface of the product supporting liquefying pan also acts as a prime coil surface and greatly accelerates the transfer of heat from the product to the body of the pan by contact, especially on the bottom of the product. A further effect of this very rapid rate of contact heat transfer is that any moisture layer on the bottom of each product unit is frozen so rapidly and to such a super cold temperature that the resultant ice which initially forms a bond between the product and the pan surface is further lowered in temperature to the point where some contraction occurs, breaking the product ice free from the pan and preventing sticking to the supporting pan, frame, or rack.

---

This application is a continuation of application Ser. No. 613,281 filed Feb. 1, 1967 and now abandoned.

The invention relates to cryogenic freezing, and especially to cryogenic food freezing, and more particularly to continuous automatic freezers of the type that employ liquefied gas.

The system preferably uses liquid nitrogen to freeze food products under cryogenic conditions. The invention eliminates short-comings of prior freezers which use liquid nitrogen as the freezing agent. For example, it eliminates conveyor belts, fans and blowers: permits more efficient product portioning and weighing before the freezing operation than is possible with other systems: and is equipped with a unique idling mechanism which prevents warm-up of the system during periods of nonuse.

The food freezing system described herein is the culmination of many years of research involving resources and technological knowhow in cryogenic hardware engineering, food processing, and controlled rate freezing methods, which, until now, had largely been confined to the freezing and long-term preservation of biological matter. The present system provides food processing with a broad range of benefits which in turn, enables then to provide consumers with a wide variety of frozen products.

Major novel features of the new cryogenic freezer system are set forth below.

Key to the system is a unique method of moving products to be frozen through tunnel sections. Individual frames which operate entirely inside the freezer are used instead of a conveyor belt. Lightweight removable trays, pans, or racks fit into the frames and travel through the system in this manner. By eliminating conventional metal conveyor belts, problems of metal expansion and contraction, uneven stress and tracking problems, and failure of metal belts operating under cryogenic conditions have been eliminated. With the exception of the frames and pusher plates which move the frames, there are no other moving parts inside the system. This design eliminates any need for drive shafts, gears, pulleys, link chain, idler pulleys and rollers, friction pans, and other mechanisms commonly necessary to conveyor belts of various design. The frame pusher arms are moved by small aircraft-type cables which are activated by timed, variable speed hydraulic mechanisms mounted outside the tunnel.

In prior conveyor belt systems, machines of the "open-end" type for continuous product entry and exit allowed ambient air to enter the machine, causing frost and ice buildup on interior walls and other surfaces. This invention avoids such difficulty by providing a relatively sealed system. Frame end walls compartmentize the trays and act as moving seals throughout the freezing cycle. This design not only prevents outside air from entering, but also keeps the pure cold nitrogen liquid and vapor continuously in contact with the food products as the frames travel through the system.

Since the refrigerant medium is thus kept in constant and direct contact with the food, fans and blowers are not required. No metal shafts extend through insulated walls, and therefore, seal and bearing freeze-up problems are avoided. Nitrogen is used more economically, also, since it doesn't have to offset extra energy (heat) put into the system by fans and blowers.

The use of the segmented frame conveying system also permits utilizing a wide range of pans, racks, or trays of functional and lightweight design as food product carriers. These can be designed to the optimum needs of various types of food as to the weight of the product, unit mass, best utilization of contact, radiant, and convection heat transfer, ease of handling, simplicity of loading and unloading, ease of cleaning and sanitizing, portion spacing or pre-weighing factors, and other practicable considerations. Food clogging is eliminated, as any drippage prior to freezing, any loose breading, or other product residue is collected in the product carrier instead of accumulating on the tunnel floor and walls or building up on moving parts. Therefore, the unit needs cleaning only once or twice a month instead of daily.

Another major advantage of the removable carrier system is the ability to pre-load products away from the freezing system itself. Thus, workers need not be crowded at the entrance port or loading station, and products can be loaded more efficiently than with a system of random placement on a moving conveyor.

Preloading also enables a processor to maintain a reasonable back-up of products to ensure constant operation of the system, and permits the pre-weighing of a specific quantity in each product carrier. This is particularly beneficial where post-freezing glazing is necessary, since there is a known product weight in each product carrier.

An idling feature of the new system eliminates the necessity for daily warmup and cleaning as well as subsequent system chill-down before operation. After each shift, or systems use, the system is sealed at the entrance and exit ports and placed on "idle." During this nonuse period, which might be overnight, or over a weekend or longer, a small controlled volume of liquid nitrogen is fed into the closed system to hold it as a highly efficient freezer until the next shaft or systems use. This idling provision inhibits bacteria build-up and keeps the system ready for immediate operation at the next work period without the customary lost time and high nitrogen consumption for pre-shift chill-down.

Research for several years into the freezing and long-term preservation of living organisms has shown that each kind of product requires a different rate of freezing for optimum results. Investigation into food freezing has also shown that each food product, and even different average unit sizes of the same product, require different freezing sequences. This invention makes it possible to match the time and temperature freezing pattern at will in order to preserve the structure, taste, flavor, and nutritional values of the food as perfectly as possible. As a result, the throughput capacity of the new freezer can be varied from 500 to 3000 pounds of product per hour depending on the kind and average unit mass of food product being frozen.

FIGURE 2 is a schematic plan view thereof;

FIGURE 3 is a schematic view in front elevation and;

FIGURE 4 is an enlarged view mainly in vertical cross-section of the machine taken on line 4.4 of FIGURE 2.

Figure 1:
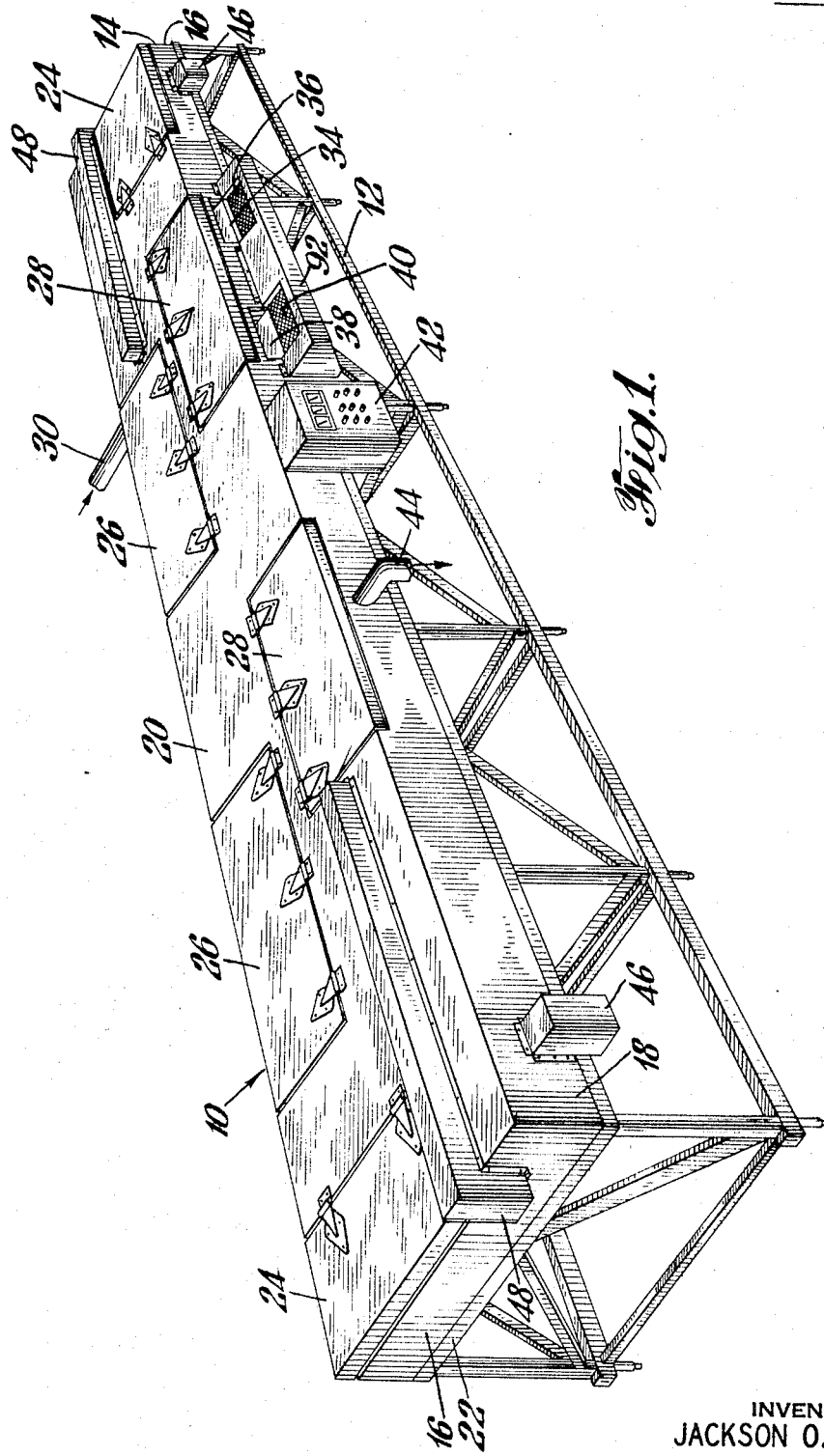
FIGURE 1 is a prospective view if a food product cryogenic freezing machine illustrative of the invention.

As shown in FIGURE 1, the machine 10 is provided with a supporting framework 12 composed of sections which are joined together for supporting an elongated cabinet of 14 that is relatively flat and substantially rectangular in shape. The end walls 16, 16 and side walls 18, 18 of the cabinet are thermally insulated, as are the top or roof 20 and bottom or floor 22. The top 20 is provided with end hatches 24, 24 and longitudinal hatches 26, 26 on one side, as well as longitudinal hatches 28, 28 on the other side. The top hatches are hinged, as shown, so that they may be opened manually for inspection of the interior of the cabinet 14, as desired.

A liquefied cryogenic gas, such as nitrogen, is introduced into the cabinet through the back side wall thereof through a liquid nitrogen supply pipe 30. Product carrier 32, FIGURE 2, loaded with food such as shrimp, is pushed into the cabinet through a rectangular port or opening 34 at a loading station 36 adjacent to the front wall of the cabinet.

After the product carrier has passed through the cabinet, it is removed through a rectangular port or opening 38 at unloading station 40. On the same side wall and adjacent the loading station 36 is an electrical control box 42. The box 42 is thus within easy reach of the operator. Such front side wall is also provided with boxes 46, 46 containing the end reaches of transverse cables, and idler pulleys of the frame transfer mechanisms.

Likewise, elongated boxes 48, 48 are provided in the upper part or roof deck of the cabinet for containing the mechanisms and pulleys for pushing the frames in opposite directions longitudinally within the cabinet.

The interior of the cabinet has a vertical longitudinal wall 50 which divides such interior into what might be called twin tunnels or longitudinal sections 52, 52 and a transverse end tunnel sections 54, 54. Thus, the complete tunnel is in the form of a rectangular path having the longitudinal sections 52, 52 located on either side of the central longitudinal wall 50, and the transverse section 54, 54 located adjacent the ends of the cabinet.

The floor 56 of the tunnel is substantially flat, or horizontally level, and is preferably composed of stainless steel. The product carriers 32 are adapted to removably fit into and be carried by individual frames 58 that are provided with four rollers or friction slides 60, adjacent the corners thereof. The rollers or friction slides 60 are adapted to roll or slide freely on the floor 56 when the frames are pushed longitudinally in the tunnel sections 52, 52. However, in the transverse tunnel sections 54, the floor 56 is provided with raised oval shaped ribs 62 for receiving the rollers or slides and position them properly into the channel thus former by such oval ribs and to guide them therein as each frame is pushed from one side of the cabinet to the other. The frames carrying the removable product carriers are pushed one after the other from behind, by upstanding arms 62. The arm 62 at each end of the cabinet, is driven by a small diameter cable 64 running on pulleys 66, 66 located on opposite sides of the cabinet, as well as by pulleys 68, 68 and 70 located under the cabinet. The ends of each cable 64 are connected to a fluid or pneumatically operated piston in a cylinder 72 through connecting rods 74, 74. The frame 58 and removable product carrier 32 are thus transferred from one side of the cabinet to the other side as each frame is indexed through the transverse sections of the cabinet.

Similarly the frames and product carriers carried thereby are moved step by step along the longitudinal tunnel sections 52, 52 by fluid driven mechanisms 78, 78 through downwardly projecting pusher arms or plates 80, 80. The food product loaded carriers 32 and frames are pushed step-by-step toward the other end, then across the cabinet, and finally step-by-step to the unloading station where the food loaded product carriers are sequentially removed.

The system permits the introduction of cryogenic refrigerant at several points into the cabinet, ideally under either hatch 26, 26. Shown is one such spraying station 82 in the tunnel section opposite the loading and unloading stations. Connected to the nitrogen sprayer 84 is liquid nitrogen pipe 30. Similarly a third spraying station might be located under longitudinal hatch 28, and be supplied with liquid nitrogen through pipe stub 44. The sprayer 84 is provided with a plurality of spray nozzle 86 which are located near the top of the tunnel and spray either horizontally, downwardly, or on a slant for insuring complete coverage of the food product to be frozen with liquid nitrogen, as well as providing the proper volume of liquid to the flat pan to be moved with the food until the liquid has been vaporized as a result of heat transfer.

The end walls 88 of the frames extend upwardly toward the roof to compartmentize the cryogenic vapor about the food product above each frame after the latter leaves a cryogenic injection area in the cabinet. The ceiling of the roof is elevated in the areas of spraying station 82. The flashed liquid is caused to move predominately in the direction the frames are travelling in order that there is a continluous flow of cold vapor moving past the food being frozen to permit exposure through the longest distance of travel. Some of the super cold vapor from spraying station 82 expands to flow in the opposite direction of the frame movement towards exhaust vent 89 in the floor of the tunnel. This opposite flow causes the food to be increasingly chilled as each frame leaves the loading station and approaches the spraying or nitrogen injection zone. Exhaust vent 89 is fitted with an interior damper which is used to regulate the escapement of cold vapor from the system.

After a period of operation, the design of the unit permits the removal of any light accumulation of snow or foreign matter with a small vacuum cleaner nozzle while the cabinet is cold. Any particles are hard frozen and exist as frozen loose powder. For periodic cleaning of the cabinet after warming where water or detergent is desired, flushing vents 90, 90 are provided at opposite ends of the cabinet adjacent the floor of the tunnel. Such vents are sealed during cryogenic operation or idling of the system.

The cabinet 14 is provided with a shelf 92 located at the front thereof adjacent the loading and unloading ports 38 and 40, whereby each loaded product carrier 32 can easily be slipped through the opening 34 into an empty frame 58 while the frames are stationary. Similarly, after processing each product carrier 32 of frozen product is slipped from its stationary frame 58 at the loading station 40 through opening 38 after the frame has completed the complete travel cycle from loading port 38. The openings 34 and 38 are closed when the system is shut down between shifts by insulated closures (not shown) which are inserted into such openings.

Light beams focused across the openings 34 and 38 onto photo-electric cells (not shown) assure non-movement of the frames 58 in the cabinet when the product carriers are inserted and removed from the frames. The control box 42 contains switches and other apparatus (not shown) for operating an electrical control timer which controls the electrical circuits (not shown) which in turn operate the fluid or pneumatic pistons automatically so that the frames and product carriers in the longitudinal tunnel sections are pushed to advance them, after the transverse tunnel frames and product carriers are transferred when the frames in the longitudinal tunnel sections are stationary.

The frames 58 are not linked to one another, and are easily removable from the cabinet 14, since they merely run or slide on the floor of the tunnel. The product carriers 32 removably fit the frames 58, and the two constitute a travel unit in the tunnel. The frames 58 are preferably made of metal, such as stainless steel; while the product carriers 32 are made of any suitable material, such as plastics, or metals such as stainless steel or aluminum. While the food product is in the system, it is in a cryogenic environment at all times, since the expansion of the vaporized nitrogen in the tunnel creates a slight pressurization and prevents any outside air from entering the cabinet against the escapement of the vapor from inside the system.

After the food product has been exposed to the liquid spray, some of the latter collects in the flat pan when a pan is used as the product carrier, assuring very rapid deep freezing of the product as the latter is moved subsequently toward the unloading station through the tunnel which is in effect closed throughout its length. The walls of the cabinet are made of stainless steel or plastic panels encasing fiberglass or other insulation so that the interior is well insulated from the atmosphere.

The frames may be coated with Teflon, and are made to provide point or line contact with one another. The upwardly extending end walls preferably are made of semi-rigid plastic material to form moving seals with the roof and side walls of the tunnel in the vapor-seal areas of the cabinet.

Advantages of the present invention include the following:

(1) No bearings, shafts, idlers, or moving components inside the cryogenic zones, other than the frame-product carrier assembly, and the cable activated pusher arms or plates. No shafts through insulated walls.

(2) All frames can be moved from system in minutes without tools.

(3) One person can load and unload products when unit is operating at maximum speed. This manual operator, however, can be eliminated by mechanizing the feeding and removal of product carriers, making system totally automatic.

(4) Monthly or semi-monthly vcauum-cleaning of cold system is sufficient. (Vs. daily warm-up, washing, and drying of open-end systems, followed by pre-freezing chill-down.)

(5) Food product is not transferred or dropped from one conveyor to another in the machine. The food product is not disturbed until it is removed from the product carrier for packaging after freezing.

(6) The elimination of fans or internal high-velocity blowers permits freezing breaded products in the system.

(7) Product carriers can be loaded away from the machine, conveyed through chutes or conveyors chilled by the exhaust nitrogen, and manually or automatically be fed into the system. Frozen product carriers can be manually or automatically removed from the system and conveyed through chutes or cold well conveyors to packers, also using exhaust nitrogen vapor from the system.

(8) More than one product at a time can be frozen for maximum product flexibility where freezing cycles are similar.

(9) Based on nature of product, bacterial control, etc. the product carriers can be sterilized after each use, if required, or desirable. (Impracticable with belt or mesh belt conveyors.)

(10) All driving mechanisms are outside the machine and easily accessible for inspection or service.

(11) Product-tailored carriers made possible desirable features of pre-weighing, portionizing, and uniform heat load, etc.

(12) System has only one electric motor.

(13) System requires less plant space, is comparatively light in weight, is built as a single unit, can be shipped "ready-to-operate" after connecting nitrogen and electrical lines, and has a relatively low initial cost based on capacity.

(14) System can be operated as an immersion, or semi-immersion freezer; or it can be operated as a spray system, or a combination of spray and partial or total immersion. Heat transfer is effected by liquid contact, spray contact, cold vapor contact, and direct contact with product carrier. By using a heavier gauge plate or flat pan in frames, each unloaded frame is maintained in a super cold condition for receiving each product carrier of unfrozen product, producing a "flywheel" effect inside the system.

(15) Because of semi-sealed operation and utilizing the idling system, no ice crystals can form inside cabinet. Any minor quantity of product moisture vapor precipitates instantly as very fine powder (snow) and is removed with the product.

(16) By eliminating the open-end apertures of other conveyor belt systems, the exhaust vapor can be forced through cold-well conveyors, or heat exchangers for additional refrigerating values.

I claim:

1. A cryogenic food freezing system comprising:
   (a) an insulated cabinet forming an elongated tunnel having a stationary flat floor;
   (b) a food loading station communicating with one section of said tunnel and a food unloading station communicating with another section of said tunnel;
   (c) a multiplicity of frames each comprising a flat bottom plate, side walls, and end walls extending upwardly from said bottom plate and adjacent the roof of said cabinet, adapted to carry said food and longitudinally move consecutively along said stationary flat floor between said loading station and said unloading station;
   (d) means for contacting the frame end walls and moving said frames one after another step-by-step, each step being a movement equal to the longitudinal length of each frame, to advance the frames between said loading station and said unloading station;
   (e) driving means outside said tunnel for actuating the frame moving means (d); and
   (f) cryogenic liquefied gas dispensing means located within said tunnel for downward flow over at least some of said frames.

2. A system according to claim 1 in which pusher arms comprise the frame moving means (d), and fluid-driven pistons with cables joining said piston to said pusher arms comprise said driving means (e).

3. A system according to clai m1 in which said stationary flat floor (a) comprises two parallel longitudinal sections located on each side of a central longitudinal wall and two transverse sections respectively located adjacent the opposite ends of said longitudinal sections in communication therewith; said food loading station (b) communicates with one end of a first longitudinal section and said food unloading section communicates with one end of the second longitudinal section adjacent to the one end of the first longitudinal section; and said frames (c) being adapted to move in a rectangular flow path from said food loading station lengthwise to the second end of said first longitudinal section, across a transverse section to the second end of said second longitudinal section and lengthwise back to the first end thereof and thence of said food unloading station.

4. A system according to claim 3 in which pusher arms comprise the frame moving means (d), and fluid-driven pistons arranged to actuate said pusher arms comprise said driving means (e) said pistons being synchronized so that frames are moved simultaneously in opopsite directions along the two longitudinal sections of said stationary flat floor and the frames in said two transverse sections are moved simultaneously cross-wise while the frames in the longitudinal sections are stationary.

5. A system according to claim 1 in which rollers are provided for moving said frames along said stationary flat floor between sad food loading station and said food unloading station.

6. A system according to claim 1 in which slides are provided for moving said frames between said food loading station and said food unloading station.

7. A cryogenic freezing system, designed primarily for food freezing applications, in combination: an insulated cabinet containing an elongated low tunnel the floor of which is substantially flat and horizontal, said tunnel providing a rectangular path having parallel longitudinal sections located on either side of a central longitudinal wall, and transverse sectons located adjacent the ends of said cabinet, flat frames adapted to move on such floor of the tunnel from a loading station, lengthwise to one end thereof, cross-wise to the other side, then lengthwise along such other side to the other end, cross-wise to the first side, and finally lengthwise along such first side to an unloading station, product pans, trays, or racks for supporting product inside flat frames as the latter move one after the other through the tunnel, means for moving the frames one after another step-by-step, each step being a movement equal to the longitudinal length of each frame, to advance the food product longitudinally and transversely through the tunnel sections from the loading station to the unloading station, and cryogenic liquefied gas sprayers or injectors located at one or more stations in the tunnel system.

References Cited

UNITED STATES PATENTS

| 2,077,608 | 4/1937 | Wood | 62—63 |
| 2,679,323 | 5/1954 | Patterson | 62—63 X |
| 2,802,341 | 8/1957 | Polk | 62—380 X |
| 3,258,935 | 7/1966 | Ross | 62—374 |

ROBERT A. O'LEARY, *Primary Examiner.*

WILLIAM E. WAGNER, *Assistant Examiner.*

U.S. Cl. X.R.

62—382; 198—24